Dec. 29, 1953  M. A. THOMPSON  2,664,065
HIGHWAY SIGNALING DEVICE
Filed Nov. 28, 1952

INVENTOR.
Mernard A. Thompson
BY
C. Lauren Maltby
ATTORNEY

Patented Dec. 29, 1953

2,664,065

UNITED STATES PATENT OFFICE 2,664,065

HIGHWAY SIGNALING DEVICE

Mernard A. Thompson, Los Angeles, Calif.

Application November 28, 1952, Serial No. 322,917

1 Claim. (Cl. 116—63)

This invention relates to motor vehicle operation and more especially to a highway signalling device. In the operation of motor vehicles along highways a common cause of accidents is the failure of drivers to keep to the right of a center line of highways, due either to carelessness or the failure of illumination of the highway center line, even though such center line may be well marked. The present invention has been evolved to rectify this condition by the provision of a plurality of devices positioned along the center line of the highway, which, if overrun by a wheel or wheels of a motor vehicle, will cause an audible signal, warning the driver of such vehicle that he is upon or over the center line and can correct his course accordingly.

Therefore, an object of the invention provides a simple, practical and effective device of the character described.

Another object of the invention is to provide a device that can be manufactured simply and easily installed on a roadway for making an audible signal when contacted by a wheel of a passing vehicle.

A further object of the invention is to provide a highway signal device consisting essentially of a plate and clapper button for installation in and along the center line of a highway to provide a warning signal that the driver of a vehicle is overrunning such center line.

Other objects and advantages will appear and be brought out more fully in the following specification, reference being had to the accompanying drawing wherein.

Figure 1:
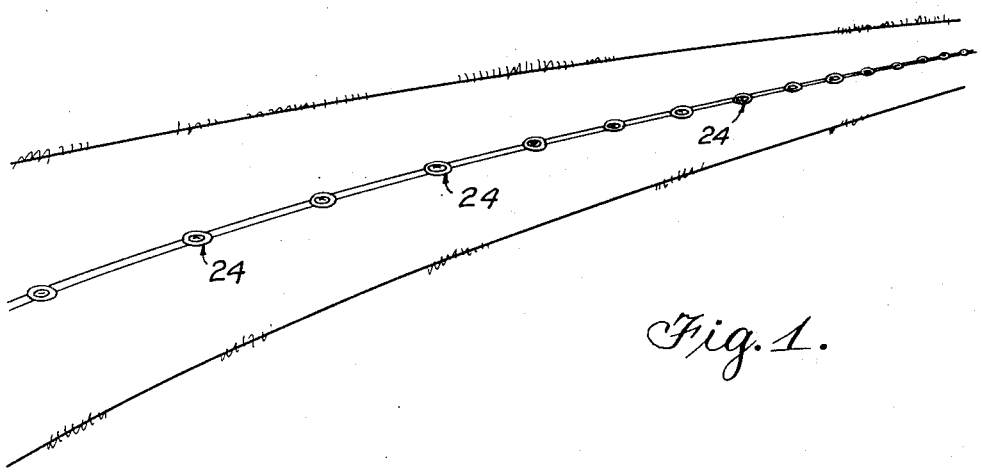
Fig. 1 is a view of a road or highway showing the invention in use therewith.
Figure 2:
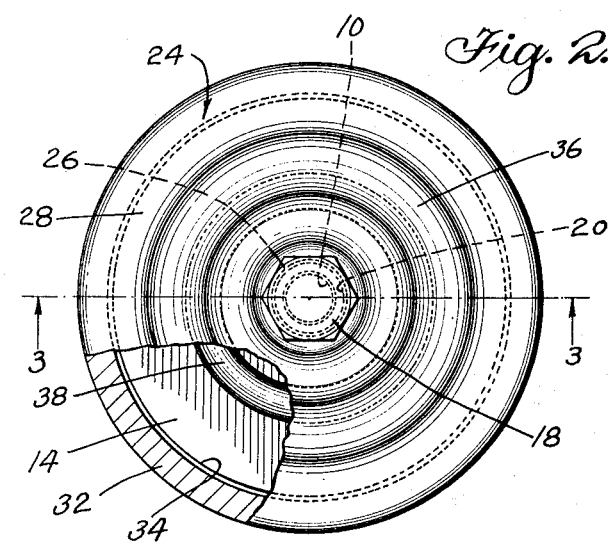
Fig. 2 is a plan view partly broken away, of the highway signalling device embodying the invention.
Figure 4:
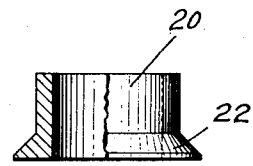
Fig. 4 is an elevation view, partly in section, of the bushing sleeve element of the invention.

Referring more particularly to the drawing, the numeral 10 designates generally the bolt or pin adapted to be embedded in or driven into the surface portion 12 of a road or highway. A plate 14, preferably though not necessarily circular in shape, has a central hole 16 through which pin 10 passes. Pin 10 has a flanged head 18 and a bushing 20 is positioned on pin 10 between plate 14 and the head of the pin, and has a flared or flanged portion 22 on which a clapper button 24 normally rests, the clapper button having a central hole 26 through which bushing 20 extends.

Button 24, preferably though not necessarily, is circular in shape, and has a peripheral portion 28 which is normally spaced, as indicated at 30, a small amount of the order of one thirty-second of an inch above plate 14, and has a depending peripheral flange 32 surrounding the side edge portion 34 of plate 14. Button 24 is formed with an annular boss 36 forming a space therebelow in which is positioned a steel ring 38, the ring being restricted as to movement only by the confines of the space below boss 36.

Figure 3:
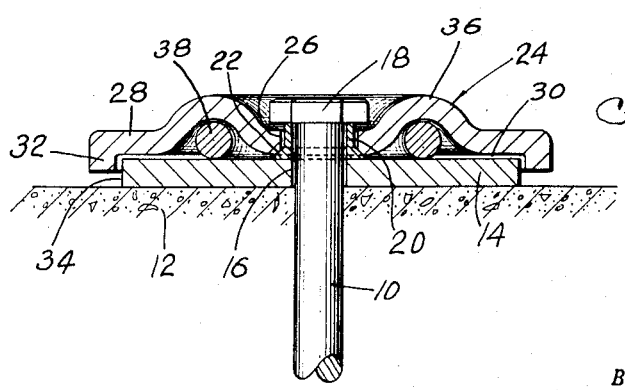
Fig. 3 is a sectional elevation view of the same.

The operation of the invention should be apparent from the foregoing description. As will be apparent from Figure 3, button 24 is normally supported only at its center on flange 22 of bushing 20, and is free to tilt on a force applied downwardly anywhere along the peripheral portion or anywhere off center. This tilting action of the button which will occur when a vehicle wheel overrides the button, will cause a distinct clapper-like audible signal which will warn the driver of any vehicle causing this action to be aware of his improper driving action so that he may correct it before the occurrence of damage to property or injury to any person.

It will be understood that the foregoing description is illustrative rather than restrictive of the invention, and that changes and modifications may be made without departing from the spirit and scope of the sub-joined claim.

Having described my invention, what I claim is:

A device of the character described, comprising in combination a circular base plate, a pin adapted to be inserted in a roadway and having a flanged head for securing said base plate on the surface of such roadway and a circular clapper plate tiltably carried by said pin above said base plate and having a peripheral portion normally spaced from said base plate and adapted to be manipulated into impact engagement therewith by the movement of a vehicle wheel thereover, said pin extending through said plates and having a clapper supporting bushing thereon.

MERNARD A. THOMPSON.

References Cited in the file of this patent

UNITED STATES PATENTS

| Number | Name | Date |
|---|---|---|
| 1,549,014 | Maxwell | Aug. 14, 1925 |
| 1,685,449 | Durand | Sept. 25, 1928 |
| 1,890,092 | Mulhollen | Dec. 6, 1932 |